Patented June 2, 1953

2,640,814

UNITED STATES PATENT OFFICE 2,640,814

TALL OIL-POLYAMINO-ALDEHYDE REACTION PRODUCT

Alfred F. Schmutzler, Stamford, Conn., assignor to American Cyanamid Company, New York, N. Y., a corporation of Maine No Drawing. Application June 12, 1951, Serial No. 231,249

19 Claims. (Cl. 260—21)

This invention relates to a process for preparing talloil amido compounds and the products produced thereby. Still further, this invention relates to a process for preparing talloil amido compounds by reacting talloil with an aldehyde-reactable polyamino compound and subsequently reacting the talloil amido compound with an aldehyde. Still further, this invention relates to a process for the preparation of resinous materials comprising reacting talloil with an alpha beta unsaturated polycarboxylic acid to form an acid adduct, thereafter heat-reacting said acid adduct with an aldehyde-reactable polyamino compound and then co-reacting this reaction product with an aldehyde.

One of the objects of the present invention is to produce a talloil aldehyde-reactable amido compound-aldehyde reaction product. A further object of the present invention is to produce a talloil amido compound by reacting talloil with an aldehyde-reactable polyamino compound and subsequently reacting said talloil amido compound with an aldehyde in the presence of an inert organic solvent. A still further object of the present invention is to produce a resinous amido compound comprising forming a talloil acid adduct by reacting talloil with an unsaturated polycarboxylic acid, thereafter heat-reacting said acid adduct with an aldehyde-reactable polyamino compound such as dicyandiamide and converting said reaction product, an imido compound, to a methylol acid imide or a corresponding polymer thereof by the reaction with an aldehyde. These and other objects of the present invention will be discussed more fully hereinbelow.

The products of the present invention will have application in the fields of surface coatings and, more particularly, in the field of printing inks and architectural finishes. There are many advantages to the present invention, particularly those which reside in the fact that one has low raw material cost, as contrasted with the higher costs experienced in the esterification of expensive fatty acids. A still further advantage of the present invention resides in the fact that the dried films become harder than those produced from conventional drying esters. A further advantage resides in the reaction of talloil with an inexpensive amino compound such as dicyandiamide, which is less expensive than the polyhydric alcohols, on the basis of functional groups, which are conventionally used in drying oil resins.

In order that the present invention may be more completely understood, the following examples are set forth in which all parts are parts by weight. It should be remembered, however, that these examples are set forth solely for the purpose of illustration, and specific enumeration of detail therein should not be interpreted as limitations on the case, except as indicated in the appended claims.

Example 1

170 parts of talloil crude, 23.2 parts of dicyandiamide and 170 parts of V. M. and P. naphtha are introduced into a suitable reaction chamber equipped with a thermometer, stirrer and reflux condenser arranged in such a way that it can be used for azeotropic distillation and separation of the aqueous layer. The charge is heated under reflux for about 20 hours at a temperature of about 132–135° C. The charge is then cooled to about 95° C. and 40.7 parts of a 37% aqueous formaldehyde solution is added and the temperature held at about 85–90° C. for 1 hour. Thereafter, the mixture is heated at a temperature of about 132–143° C. for about 2 hours, during which time water is distilled off azeotropically. The resulting resin has an acid number of 140. To this resultant resinous material there is added about 0.04% of cobalt and about 0.08% of calcium driers and a thin film, produced on glass, dried tack-free to a very hard surface overnight.

Example 2

In a suitable reaction chamber, as described in Example 1, 50 parts of maleic anhydride and 1400 parts of Acintol D (a distilled talloil containing about 32% rosin acids) are heated to 200° C. under a blanket of inert gas and held at 200–210° C. for about 3 hours, whereupon it is cooled to about 135° C. and 200 parts of dicyandiamide are added. The temperature drops to about 125° C. and the batch is then reheated up to about 140–145° C. and held at that temperature for about 5 hours. The batch is then cooled to 105° C., whereupon 200 parts of V. M. and P. naphtha are added. The temperature is noted to drop to about 90° C. but, if necessary, it may be cooled to about that temperature. Thereupon, 336 parts of a 37% aqueous solution of formaldehyde are added, which causes the temperature to drop further to about 75° C. The batch is held at 75–80° C. for about 1 hour and is then heated to reflux (about 96° C.) and the water is distilled off and separated by means of a separator and decanting device, permitting the hydrocarbon solvent to return to the sphere of reaction. The maximum batch temperature of about 145° C. is reached when about 250 parts of water have been collected. When no more water is being removed, the batch is cooled to about 90° C. and filtered. The resulting resin solution consists of about 90% non-volatile or solid resin and about 10% V. M. and P. naphtha. The viscosity of the resultant resinous solution is equivalent to about Z–8 on the Gardner-Holdt scale at 25° C. and has an acid number of about 70. A solution of the resin in Varsol No. 1 (mineral spirits) is clear. When 0.03% cobalt as cobalt naphthenate and 0.20% lead as lead naphthenate are added, the films, drawn down therefrom, dry dust-free in about 2 hours and hard in about 12 hours. The percentage of the driers added is based on the non-volatile content of the solution. Further films were drawn from the resinous solution on glass, in thicknesses of about 50 mils and these films dried throughout without signs of wrinkling and the dried film is characterized by its extreme hardness.

*Example 3*

A suitable reaction chamber, equipped as in Example 1, is charged with 8 parts of maleic acid anhydride and 280 parts of Acintol D. The process of Example 2 is followed, wherein 40 parts of dicyandiamide are added and, in turn, 55 parts of V. M. and P. naphtha and 67.2 parts of a 37% aqueous formaldehyde solution. The azeotropic distillation is continued until about 50 parts of water are removed. The resulting resinous solution is somewhat slower drying, but more flexible and not quite as hard as that of Example 2.

*Example 4*

Example 2 is again repeated, in which the following ingredients are charged in turn. 8 parts of fumaric acid, 280 parts of Acintol D, 40 parts of dicyandiamide and 67.2 parts of a 37% aqueous solution of formaldehyde. The resulting resinous solution, containing comparable amounts of driers, as in Example 2, dried to produce very hard films in 16 hours.

*Example 5*

40 parts of dicyandiamide and 280 parts of Acintol D are introduced into a suitable reaction chamber equipped as in Example 1 and the mixture is heated to a temperature of about 130–135° C. and it is held at that temperature for about 6 hours, with constant agitation. The reaction mixture is then cooled to about 120° C., whereupon 40 parts of naphtha are added gradually and the cooling is continued to about 95° C. 67.2 parts of a 37% aqueous solution of formaldehyde are then added. The contents of the reaction chamber are held at about 80–95° C. for 1 hour and then, as in Example 2, water is distilled off by azeotropic distillation. The separation of the water from the hydrocarbon is continued, while the hydrocarbon is returned to the sphere of reaction. The azeotropic distillation is discontinued after about 50 parts of water are removed. The resin solution thus produced is slightly softer than that of Example 4 and correspondingly slower-drying, but more flexible.

*Example 6*

25 parts of dicyandiamide, 175 parts of Acintol D and 100 parts of Varsol No. 1 are introduced into a suitable reaction chamber equipped, as in Example 1, and the mixture is heated to about 125–130° C. and is maintained at that temperature for about 6 hours. The contents of the chamber are then cooled to about 96° C. and 42 parts of a 37% aqueous solution of formaldehyde are added. The reaction mixture is held at about 80–90° C. for 1 hour, followed by the distillation of water by azeotropic distillation method with the return of Varsol No. 1 to the batch. After 29 parts of water have been collected, the temperature is 145° C. Distillation is continued for the purpose of removing 10 parts of the hydrocarbon solvent, for which 10 parts of butanol are added to the batch. The presence of the butanol is desirable for complete solubility of the resin when the larger amounts of dicyandiamide are used.

*Example 7*

Example 6 is repeated in which 42 parts of a 30.3% glyoxal aqueous solution are substituted for the aqueous formaldehyde solution. The resultant resin is dark brown.

*Example 8*

Example 6 is again repeated, except that in the place of the Varsol No. 1, there is substituted 100 parts of cyclohexane.

*Example 9*

23.1 parts of melamine and 170 parts of crude talloil are introduced into a suitable reaction chamber, equipped as in Example 1. The mixture is heated for approximately 2 hours at 225° C. and is then cooled to 95° C., whereupon 41 parts of a 37% aqueous formaldehyde solution are added and the mixture is held at 87–95° C. for about 2 hours. Thereupon, the temperature is raised gradually to about 255° C. and 33 parts of water are collected. The resulting resin is a very viscous paste, but soluble in Varsol No. 1. A 66.7% solution of this resin in Varsol No. 1 has a viscosity equivalent to about H on the Gardner-Holdt scale at 25° C. When suitable amounts of the metallic driers are added, the resin solution, cast as a thin film on glass, sets dust-free in 4 hours and dry to handle overnight.

*Example 10*

1450 parts of Facoil C. S. (an acid refined talloil) and 250 parts of dicyandiamide are introduced into a suitable reaction vessel equipped as in Example 1, and the mixture is heated with constant stirring to about 145° C. and is held at that temperature for about 2½ hours, whereupon 300 parts of P–1 ink oil are added slowly and the reaction mixture is cooled to about 95° C. 420 parts of a 37% aqueous formaldehyde solution are then added and the temperature drops to about 75° C. but rises quickly to about 80–81° C. The reaction mixture is held for about 1 hour at about 85–90° C. and 20 parts of carbitol (monoethyl ether of diethylene glycol) are added and azeotropic distillation of water is begun during which the non-aqueous miscible solvent is returned to the batch. The batch is heated until a temperature of 150° C. is reached, whereupon the reaction is discontinued and reaction product is cooled. During the azeotropic distillation, about 250 parts of water are removed.

This example demonstrates the use of an acid refined talloil, containing 44–50% rosin acids and further demonstrates the use of two solvents which tend to provide better solubility of the resinous reaction product.

In the place of carbitol, other high boiling ether-alcohol compounds can be used for the purpose of reducing the viscosity of the resinous reaction product in hydrocarbon solvents.

Example 11

Example 10 is repeated except 1400 parts of Facoil C. S., 200 parts of dicyandiamide, 194 parts of P-1 in oil (a kerosene fraction which boils between 460 and 530° F.) and 336 parts of a 37% aqueous formaldehye solution are used. In the place of the carbitol, 25 parts of dipropylene glycol are used.

Example 12

20 parts of the resin prepared according to Example 11, 10 parts of carbon black, 2 parts of a 40% solution of methyl violet base in talloil, 2 parts of a mixed drier solution (1:1:1 cobalt, manganese and lead naphthenate) and 16 parts of P-1 ink oil are mixed and milled to a smooth paste. Prints, on coated stock, set, to non-offsetting films, in about 15 minutes and became hard in about 4 hours. When exposed to high temperatures, as used in heat setting of magazine printing, the prints set very quickly to non-smudging films.

Example 13

Example 10 is repeated except that the materials used are 1250 parts of Facoil C. S., 350 parts of dicyandiamide, 258 parts of P-1 ink oil, 336 parts of a 37% aqueous formaldehyde solution and in the place of the carbitol, there is used a mixture of 48 parts of dipropylene and 24 parts of ethylene glycol.

In the place of the above mentioned glycols, there may be substituted propyl glycol, pentylene glycol, hexylene glycol and the like or mixture of the same may be used.

Example 14

22 parts of the resin prepared in accordance with the preceding example, 10 parts of carbon black, 2 parts of a 40% methyl violet base solution in talloil and 16 parts of dipropylene glycol are mixed and milled to a smooth paste. Prints of the resulting ink dry quickly on exposure to high temperatures such as those conventionally used in heat setting magazine printing. This ink can also be used as a steam-setting ink depending upon the exposure of its prints to steam or a high concentration of moisture. When the prints of this ink are exposed to steam, transition to non-smudging films takes place quickly. This ink also dries in air without benefit of heat or steam. On coated stock, the ink air-dried sufficiently to touch in about 15 minutes and was completely dry in 3 hours.

Example 15

22 parts of the resin prepared in accordance with Example 13, 10 parts of carbon black, 2 parts of a 40% methyl violet base solution in talloil, 1 part of a mixed drier solution (1:1:1 of cobalt, manganese and lead naphthenate), 15 parts of P-1 ink oil are mixed and milled to a smooth paste.

Prints of this ink dry quickly upon exposure to high temperatures or can be air dried to set; to a non-offsetting film on coated stock, in about 1 minute and became non-smudging and hard in about 4 hours.

Any aldehyde-reactable polyfunctional polyamino compound may be used in the practice of the process of the present invention, but dicyandiamide is the preferred aldehyde-reactable amino compound because of its low price and because of its good reaction rate with the preferred aldehyde, namely, formaldehyde. However, other nitrogen-containing compounds of the type described could be used for the same purpose, such as melamine, guanidine, aminoguanidine, biguanide, thioammeline, ammeline, thiobiuret, urea, thiourea, ethylene diamine, diethylene triamine and the like.

It is possible to prepare the products of the present invention by varying the weight ratio of the talloil to the dicyandiamide or other aldehyde-reactable polyamino compounds rather substantially. It should be noted, however, that in the use of amounts larger than 18% of dicyandiamide of the weight of talloil, it is desirable to use an alcohol, such as butanol, pentanol, isopropanol, or a polyhydric alcohol, such as ethylene glycol, diethylene glycol, or even glycol ethers and gycol esters. These alcohol-type compounds will be added to the hydrocarbon solvent for better solubility of the reaction product.

It has been stated hereinabove that the preferred aldehyde is formaldehyde, although other aldehydes may be used, such as acetaldehyde, crotonic aldehyde, acrolein, benzaldehyde, furfural, propionaldehyde, paraldehyde, paraformaldehyde and the like. The term, aldehydes, includes not only the aldehydes themselves but also compounds yielding aldehydes, such as trioxal, trioxymethylene and dioxal.

In the preparation of the products of the present invention, one may vary the mol ratios of the aldehyde to the aldehyde-reactable polyamino compound rather substantially. For instance, one may use one mol of dicyandiamide with from 0.5 to 4 mols of an aldehyde such as formaldehyde but preferably 1:0.8 to 1:2 mols, respectively. With diamino compounds such as urea, one may use urea to aldehyde in a mol ratio of 1:0.8 to 1:1.5, respectively, and with polyamino compounds the same range would be preferred plus 0.5 mols of aldehyde for each reactive amino group present in excess of two reactive amino groups.

In the preparation of the dicyandiamide-talloil-formaldehyde reaction product, temperatures of less than 150° C. are preferred as the maximum temperature of reaction. Temperatures higher than 150° C. have a tendency to darken the final product. However, in the preparation of aminotriazine-talloil-formaldehyde reaction products, temperatures as high as 225° C. may be used without any noticeable darkening of the final reaction product.

In the practice of the process of the present invention, it is possible to prepare these reaction products with or without the use of a solvent. When one prepares these reaction products without benefiit of a solvent, it is advisable to blanket the contents of the reaction chamber with an inert gas, whereas with a solvent, it is generally desired to blanket the contents of the reaction chamber prior to the start of distillation and also during the cooling step at the end of the reaction.

Still further, when an addition of a solid material to the reaction sphere is being made, it is desired to blanket the reactable materials with an inert gas in order to expel the oxygen-containing air contained therein. In addition to the V. M. and P. naphtha (Varnish Makers and Paint naphtha) which has been mentioned in several of the examples, one may use other solvents, such as benzol, toluol, xylol and other mineral spirits, such as Varsol No. 1, Varsol No. 2, Solvesso No. 100 and other paint thinners. The V. M. and P. naphtha is a well-known petroleum solvent having a low kauri-butanol value.

When one selects the higher-boiling solvents, dehydration of the batch can be substantially completed below 150° C., although minor traces of moisture will remain. These traces of moisture may show up as a slight milkiness in the appearance of the reaction product, but this deficiency can be corrected by the addition of a monohydric aliphatic alcohol, a glycol, an ether of a polyhydric alcohol, such as Cellosolve, monoallyl ethers of glycerol and the like, or esters of a polyhydric alcohol, which have one or more hydroxy groups in an unesterified condition or as terminal groups.

In the practice of the process of the present invention, one may use either the crude talloil or the refined talloil, but for improved characteristics of the final product, it is preferred to use the refined talloil. Crude talloil generally has, as its principal components, about 46–50% rosin acids and about 43–47% fatty acids, plus relatively small amounts (6–8%) of unsaponifiable materials, ash and moisture, whereas the refined distilled talloil consists substantially of the fatty acids and smaller percentages of rosin acids.

The polycarboxylic acids which may be used in the practice of the process of the present invention are the alpha, beta unsaturated polycarboxylic acids. Amongst these acids are maleic acid, fumaric acid, aconitic acid, itaconic acid and the like. These acids form acid adducts when heated with talloil. Although the use of the alpha, beta unsaturated polycarboxylic acids are preferred, one may use the alpha, beta unsaturated monocarboxylic acids, such as crotonic acid and the like for the formation of an addition compound with the rosin acids and fatty acid which undergo the Diels-Alder reaction. The use of the alpha, beta unsaturated polycarboxylic acids form hard resins as an ultimate result. Whenever available, the anhydrides of these acids may be used and they may be used either singly or in combination with one another.

Obviously, these fundamental resinous reaction products may be modified in a plurality of ways, such as in the preparation of printing inks and other surface coatings, and one may add the conventional colorants, such as pigments, dyes, etc. Still further, one can modify these reaction products by blending with alkyd resins of the various types, such as the oil-free and the oil-modified saturated and unsaturated alkyd resins; and, still further, one may incorporate into the reaction products such additives as anticratering agents, such as the polymeric alkyl esters of the alpha, beta unsaturated mono and polycarboxylic acids.

I claim:

1. A process for the preparation of a hydrocarbon solvent soluble resinous material comprising heat-reacting talloil with an aldehyde-reactable resin forming polyamino compound, adding an aldehyde and heat-reacting the mixture to form a resinous material.

2. A process for the preparation of a hydrocarbon solvent soluble resinous material comprising heat-reacting talloil with an alpha beta unsaturated polycarboxylic acid to form an adduct, then heat-reacting the talloil-acid adduct with an aldehyde-reactable resin forming polyamino compound, thereafter heat-reacting said talloil-acid adduct-amino compound reaction product with an aldehyde to produce a resinous material.

3. A process for the preparation of a hydrocarbon solvent soluble resinous material comprising heat-reacting talloil with an alpha beta unsaturated polycarboxylic acid to form an adduct, then heat-reacting the talloil-acid adduct with an aldehyde-reactable resin forming polyamino compound, thereafter heat-reacting, in an inert organic solvent, said talloil-acid adduct-amino compound reaction product with an aldehyde to produce a resinous material.

4. A process for the preparation of a hydrocarbon solvent soluble resinous material comprising heat-reacting talloil with fumaric acid to form an adduct, then heat-reacting the talloil-fumaric acid adduct with an aldehyde-reactable resin forming polyamino compound, thereafter heat-reacting said talloil-fumaric acid-amino compound reaction product with an aldehyde to produce a resinous material.

5. A process for the preparation of a hydrocarbon solvent soluble resinous material comprising heat-reacting talloil with maleic acid anhydride to form an adduct, then heat-reacting the talloil-maleic acid adduct with an aldehyde-reactable resin forming polyamino compound, thereafter heat-reacting said talloil-acid adduct-amino compound reaction product with an aldehyde to produce a resinous material.

6. A process for the preparation of a hydrocarbon solvent soluble resinous material comprising heat-reacting talloil with an alpha beta unsaturated polycarboxylic acid to form an acid adduct, then heat-reacting the talloil-acid adduct with dicyandiamide, thereafter heat-reacting said talloil-acid adduct-dicyandiamide reaction product with formaldehyde to produce a resinous material.

7. A process for the preparation of a hydrocarbon solvent soluble resinous material comprising heat-reacting talloil with an alpha beta unsaturated polycarboxylic acid to form the acid adduct, then heat-reacting the talloil-acid adduct with melamine, thereafter heat-reacting said talloil-acid adduct-melamine reaction product with formaldehyde to produce a resinous material.

8. A process for the preparation of a hydrocarbon solvent soluble resinous material comprising heat-reacting talloil with fumaric acid to form the acid adduct, then heat-reacting the talloil-acid adduct with dicyandiamide, thereafter heat-reacting said talloil-acid adduct-dicyandiamide reaction product with formaldehyde to produce a resinous material.

9. A process for the preparation of a hydrocarbon solvent soluble resinous material comprising heat-reacting talloil with maleic acid anhydride to form an acid adduct, then heat-reacting the talloil-acid adduct with dicyandiamide, thereafter heat-reacting said talloil-acid adduct-dicyandiamide reaction product with formaldehyde to produce a resinous material.

10. A process for the preparation of a hydrocarbon solvent soluble resinous material comprising heat-reacting talloil with fumaric acid to form an acid adduct, then heat-reacting the talloil-acid adduct with melamine, thereafter heat-reacting said talloil-acid adduct-melamine reaction product with formaldehyde to produce a resinous material.

11. A process for the preparation of a hydrocarbon solvent soluble resinous material comprising heat-reacting talloil with maleic acid anhydride to form an acid adduct, then heat-reacting the talloil-acid adduct with melamine, thereafter heat-reacting said talloil-acid adduct-melamine reaction product with formaldehyde to produce a resinous material.

12. A hydrocarbon solvent soluble resinous material comprising the heat-reaction product of talloil, an aldehyde-reactable resin forming polyamino compound and an aldehyde.

13. A hydrocarbon solvent soluble resinous composition comprising the heat-reaction product of talloil, an alpha beta unsaturated polycarboxylic acid, an aldehyde-reactable resin forming polyamino compound and an aldehyde.

14. A hydrocarbon solvent soluble resinous composition comprising the reaction product of talloil, maleic acid anhydride, an aldehyde-reactable resin forming polyamino compound and an aldehyde.

15. A hydrocarbon solvent soluble resinous composition comprising the heat-reaction product of talloil, fumaric acid, an aldehyde-reactable resin forming polyamino compound and an aldehyde.

16. A hydrocarbon solvent soluble resinous composition comprising the heat-reaction product of talloil, fumaric acid, dicyandiamide and formaldehyde.

17. A hydrocarbon solvent soluble resinous composition comprising the heat-reaction products of talloil, maleic acid anhydride, dicyandiamide and formaldehyde.

18. A hydrocarbon solvent soluble resinous composition comprising the heat-reaction product of talloil, maleic acid anhydride, melamine and formaldehyde.

19. A hydrocarbon solvent soluble resinous composition comprising the heat-reaction product of talloil, fumaric acid, melamine and formaldehyde.

ALFRED F. SCHMUTZLER.

References Cited in the file of this patent

FOREIGN PATENTS

| Number | Country | Date |
|---|---|---|
| 121,184 | Sweden | Mar. 16, 1948 |
| 611,012 | Great Britain | Oct. 25, 1948 |